United States Patent
Li

(10) Patent No.: US 8,593,508 B2
(45) Date of Patent: Nov. 26, 2013

(54) METHOD FOR COMPOSING THREE DIMENSIONAL IMAGE WITH LONG FOCAL LENGTH AND THREE DIMENSIONAL IMAGING SYSTEM

(75) Inventor: Yun-Chin Li, Taipei County (TW)

(73) Assignee: Altek Corporation, Hsinchu (TW)

( * ) Notice: Subject to any disclaimer, the term of this patent is extended or adjusted under 35 U.S.C. 154(b) by 366 days.

(21) Appl. No.: 13/178,525

(22) Filed: Jul. 8, 2011

(65) Prior Publication Data

US 2012/0105596 A1 May 3, 2012

(30) Foreign Application Priority Data

Oct. 29, 2010 (TW) ................................ 99137274 A

(51) Int. Cl.
*H04N 13/02* (2006.01)
(52) U.S. Cl.
USPC ............................................................. 348/49
(58) Field of Classification Search
USPC .............. 348/47, 49, 218.1; 352/48; 382/154; 396/325, 326
See application file for complete search history.

(56) References Cited

U.S. PATENT DOCUMENTS

| 8,508,584 B2 * | 8/2013 | Iwasaki ........................... 348/49 |
| 2011/0018970 A1 * | 1/2011 | Wakabayashi .................. 348/47 |

FOREIGN PATENT DOCUMENTS

| TW | I223780 | 11/2004 |
| TW | 200537126 | 11/2005 |

* cited by examiner

*Primary Examiner* — Sath V Perungavoor
*Assistant Examiner* — Chia Lun Hang
(74) *Attorney, Agent, or Firm* — Jianq Chyun IP Office

(57) ABSTRACT

A method for composing a three dimensional image with a long focal length and a three dimensional imaging system are provided. First, a zoom lens is adjusted to a first focal length to capture a first image and a fixed focal lens is used to capture a second image. Next, the zoom lens is adjusted to a second focal length to capture a third image. Then, a region occupied by the third image in the first image is positioned, a first disparity map between the first and second image in the region is calculated and magnified to obtain a second disparity map. Finally, a fourth image simulating the image captured by the fixed focal lens with the second focal length is composed by using the third image and the second disparity map, and the third and fourth image are output as a three dimensional image.

10 Claims, 6 Drawing Sheets ated patent application is hereby
METHOD FOR COMPOSING THREE DIMENSIONAL IMAGE WITH LONG FOCAL LENGTH AND THREE DIMENSIONAL IMAGING SYSTEM

CROSS-REFERENCE TO RELATED APPLICATION

This application claims the priority benefit of Taiwan application serial no. 99137274, filed on Oct. 29, 2010. The entirety of the above-mentioned patent application is hereby incorporated by reference herein and made a part of this specification.

BACKGROUND OF THE INVENTION

1. Field of the Invention

The present invention generally relates to a method and a system for generating an image, in particular, to a method for composing a three dimensional (3D) image with a long focal length and a three dimensional imaging system.

2. Description of Related Art

A stereo camera consists of two lenses having the same specifications, and a distance between the two lenses is about 7.7 cm, thus simulating an actual distance between human eyes. Parameters of the two lenses, such as focal lengths, apertures, and shutters are controlled by a processor of the stereo camera. By triggering through a shutter release, images of the same area but of different perspectives are captured, and the images are for simulating a human left-eye image and a human right-eye image.

The left-eye image and the right-eye image captured by the stereo camera are displayed by a display device alternately at a frequency exceeding persistence of vision of the human eyes, and meanwhile with the switching of liquid crystal shutter glasses worn on the human head, a human being can view the corresponding left-eye image and the right-eye image with the left and right eyes. After being conducted to the cerebral cortex, the left-eye image and the right-eye image are fused into a single image by the cortical centre. Since the left-eye image and the right-eye image captured by the stereo camera may be slightly different in angles, a certain parallax exists between two object images formed on the retinas, and the object images of different perspectives in the two eyes can be fused by the cortical centre to make a human being have a three dimensional impression.

Currently, a simplified stereo camera is available on the market, in which a zoom lens is adopted as a main lens, and a wide angle fixed focal lens is adopted as the other lens to serve as a supplementary lens for the main lens. Such a stereo camera is capable of capturing a three dimensional image with a specific focal length, and can save the cost and simplify the structural design, thus achieving the purpose of being light, thin, short, and small.

However, since the stereo camera has to adopt a left lens and a right lens with the same focal length to capture images of the same scene simultaneously so as to make the captured images have a three dimensional effect, the simplified stereo camera only can capture a three dimensional image with a specific focal length. When a user stretches the zoom lens, only the main lens may capture a magnified image, and the supplementary lens will still capture a wide angle image, such that the two images captured by the stereo camera do not have the same content, and cannot be composed into a three dimensional image.

SUMMARY OF THE INVENTION

Accordingly, the present invention is directed to a method for composing a three dimensional image with a long focal length and a three dimensional imaging system, which are capable of composing a three dimensional image with different focal lengths.

The present invention provides a method for composing a three dimensional image with a long focal length, which is applicable to a three dimensional imaging system including a zoom lens and a fixed focal lens. The fixed focal lens has a first focal length. The method includes the following steps. First, a focal length of the zoom lens is adjusted to the first focal length, and a first image and a second image are captured with the zoom lens and the fixed focal lens respectively. Next, the focal length of the zoom lens is adjusted to a second focal length, and a third image is captured with the zoom lens. Then, a region occupied by the third image in the first image is positioned according to a magnifying power of the second focal length with respect to the first focal length, a first disparity map between the first image and the second image in the region is calculated, and the first disparity map is magnified according to the magnifying power to obtain a second disparity map. Finally, a fourth image simulating the image captured by the fixed focal lens with the second focal length is composed by using the third image and the second disparity map, and the third image and the fourth image are output as a three dimensional image.

In an embodiment of the present invention, the step of positioning the region occupied by the third image in the first image according to the magnifying power of the second focal length with respect to the first focal length includes: determining a size occupied by the third image in the first image according to the magnifying power, and acquiring a central region of the size in the first image as the region occupied by the third image in the first image.

In an embodiment of the present invention, the step of calculating the first disparity map between the first image and the second image in the region includes calculating disparity values of a plurality of pixels of the first image and the second image in the region, and collecting the disparity values of the pixels to generate the first disparity map.

In an embodiment of the present invention, the step of magnifying the first disparity map according to the magnifying power to obtain the second disparity map includes magnifying the first disparity map into the second disparity map through interpolation according to the magnifying power.

In an embodiment of the present invention, the step of composing the fourth image by using the third image and the second disparity map to simulate the image captured by the fixed focal lens with the second focal length includes superposing the second disparity map on the third image to compose the fourth image.

The present invention provides a method for composing a three dimensional image with a long focal length, which is applicable to a three dimensional imaging system including a zoom lens and a fixed focal lens. The fixed focal lens has a first focal length. The method includes the following steps. First, a focal length of the zoom lens is adjusted to the first focal length, and a first image and a second image are captured with the zoom lens and the fixed focal lens respectively. Next, the focal length of the zoom lens is adjusted to a second focal length, and a third image is captured with the zoom lens. Then, a region occupied by the third image in the first image is positioned according to a magnifying power of the second focal length with respect to the first focal length. Thereafter, a correlation of a plurality of examples in the region of the first image and corresponding examples in the third image is found by using an example-based super resolution image method, to train an example database. Finally, corresponding examples in the example database that match with a plurality of examples in the region of the second image are searched, to compose a fourth image simulating the image captured by the fixed focal lens with the second focal length and the third image and the fourth image are output as a three dimensional image.

In an embodiment of the present invention, the step of searching the corresponding examples in the example database that match with the examples in the region of the second image, to compose the fourth image simulating the image captured by the fixed focal lens with the second focal length includes combining the matched corresponding examples according to relative positions of the examples in the region of the second image, to compose the fourth image.

The present invention provides a three dimensional imaging system, which includes a zoom lens, a fixed focal lens, and a processing unit. The zoom lens is used for capturing a first image with a first focal length, and capturing a third image with a second focal length. The fixed focal lens has a first focal length, and is used for capturing a second image. A lens pitch exists between the zoom lens and the fixed focal lens. The processing unit is coupled to the zoom lens and the fixed focal lens, and includes a positioning module, a disparity calculating module, and an image composing module. The positioning module is used for positioning a region occupied by the third image in the first image according to a magnifying power of the second focal length with respect to the first focal length. The disparity calculating module is used for calculating a first disparity map between the first image and the second image in the region, and magnifying the first disparity map according to the magnifying power to obtain a second disparity map. The image composing module is used for composing a fourth image by using the third image and the second disparity map to simulate the image captured by the fixed focal lens with the second focal length, and outputting the third image and the fourth image as a three dimensional image.

The present invention provides a three dimensional imaging system, which includes a zoom lens, a fixed focal lens, and a processing unit. The zoom lens is used for capturing a first image with a first focal length, and capturing a third image with a second focal length. The fixed focal lens has a first focal length, and is used for capturing a second image. A lens pitch exists between the zoom lens and the fixed focal lens. The processing unit is coupled to the zoom lens and the fixed focal lens, and includes a positioning module, a training module, and a searching module. The positioning module is used for positioning a region occupied by the third image in the first image according to a magnifying power of the second focal length with respect to the first focal length. The training module is used for finding a correlation of a plurality of examples in the region of the first image and corresponding examples in the third image by using an example-based super resolution image method, to train an example database. The searching module is used for searching corresponding examples in the example database that match with a plurality of examples in the region of the second image, to compose a fourth image simulating the image captured by the fixed focal lens with the second focal length, and outputting the third image and the fourth image as a three dimensional image.

Based on the above, according to the method for composing a three dimensional image with a long focal length and the three dimensional imaging system of the present invention, an image with a long focal length of the fixed focal lens is composed through disparity map interpolation or a super resolution image method, such that the focal lengths of the images captured by the zoon lens and the fixed focal lens of the stereo camera are identical, thus providing a desirable three dimensional imaging effect.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
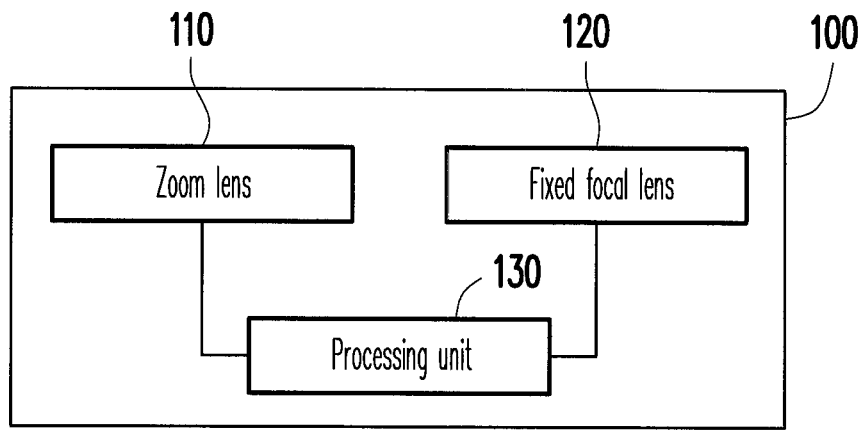
FIG. 1 is a schematic view of a three dimensional imaging system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

It can be known from the imaging principle of thin film lenses that, when the object distance remains unchanged, if the focal length of the lens is changed, the image is zoomed in or out. When the main optical axis remains unchanged, the magnified region of the image is in the form of magnifying radially outwards from the central region, which is a digital zoom mode of common single lens cameras. The present invention calculates the relative magnified region according to the focal length of a zoom lens before and after zooming, and when capturing an image with a long focal length, the focal length of the zoom lens is moved into a focal length of a fixed focal lens to capture left and right images of the same scene, and then, the zoom lens is moved to a long focal length to capture an image with the long focal length. According to the captured left and right images with a short focal length, the image with the long focal length, and the change of the focal length, a three dimensional image with different focal lengths of the fixed focal lens can be simulated, which is described in detail through embodiments below.

FIG. 1 is a schematic view of a three dimensional imaging system according to an embodiment of the present invention. Referring to FIG. 1, a three dimensional imaging system 100 of this embodiment is, for example, a stereo camera, and includes a zoom lens 110, a fixed focal lens 120, and a processing unit 130. The fixed focal lens 120 has a specific focal length, and the zoom lens 110 is capable of zooming to a plurality of focal lengths.

The zoom lens 110 and the fixed focal lens 120 both have a photosensitive element (not shown) disposed therein for sensing the intensity of light entering the zoom lens 110 and the fixed focal lens 120 respectively, and thus generating a three dimensional image. The photosensitive element is, for example, but is not limited to, a charge coupled device (CCD), a complementary metal-oxide semiconductor (CMOS), or other elements. Furthermore, a lens pitch of, for example, about 77 mm exists between the zoom lens 110 and the fixed focal lens 120, to simulate an actual distance between human eyes.

The processing unit 130 is, for example, a central processing unit (CPU), or other programmable microprocessors, digital signal processors (DSP), programmable controllers, application specific integrated circuits (ASIC), programmable logic devices (PLD) or the like, and is coupled to the zoom lens 110 and the fixed focal lens 120 to process images captured by the zoom lens 110 and the fixed focal lens 120, so as to simulate a three dimensional image with different focal lengths of the fixed focal lens 120.

Figure 2:
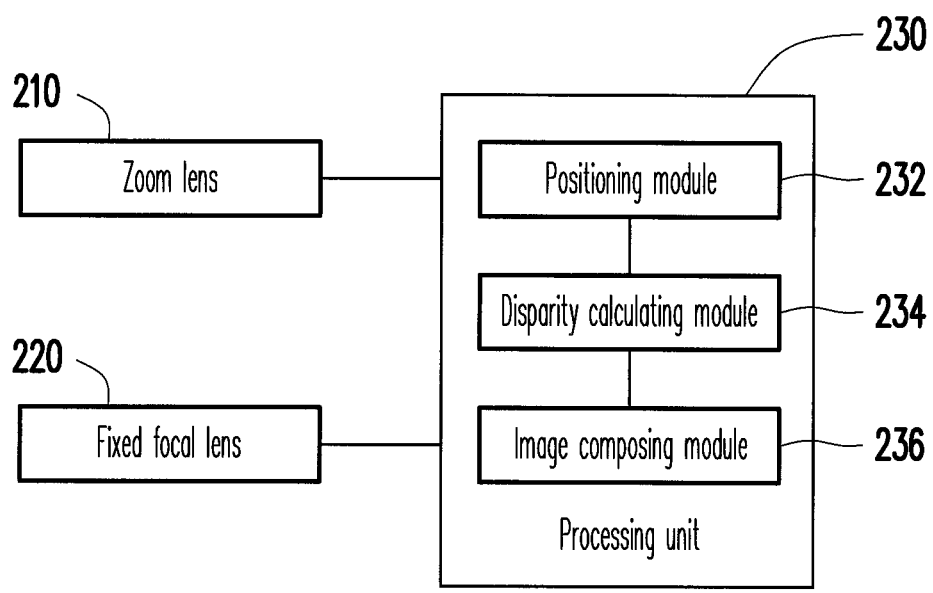
FIG. 2 is a block diagram of a three dimensional imaging system according to an embodiment of the present invention.
Figure 3:
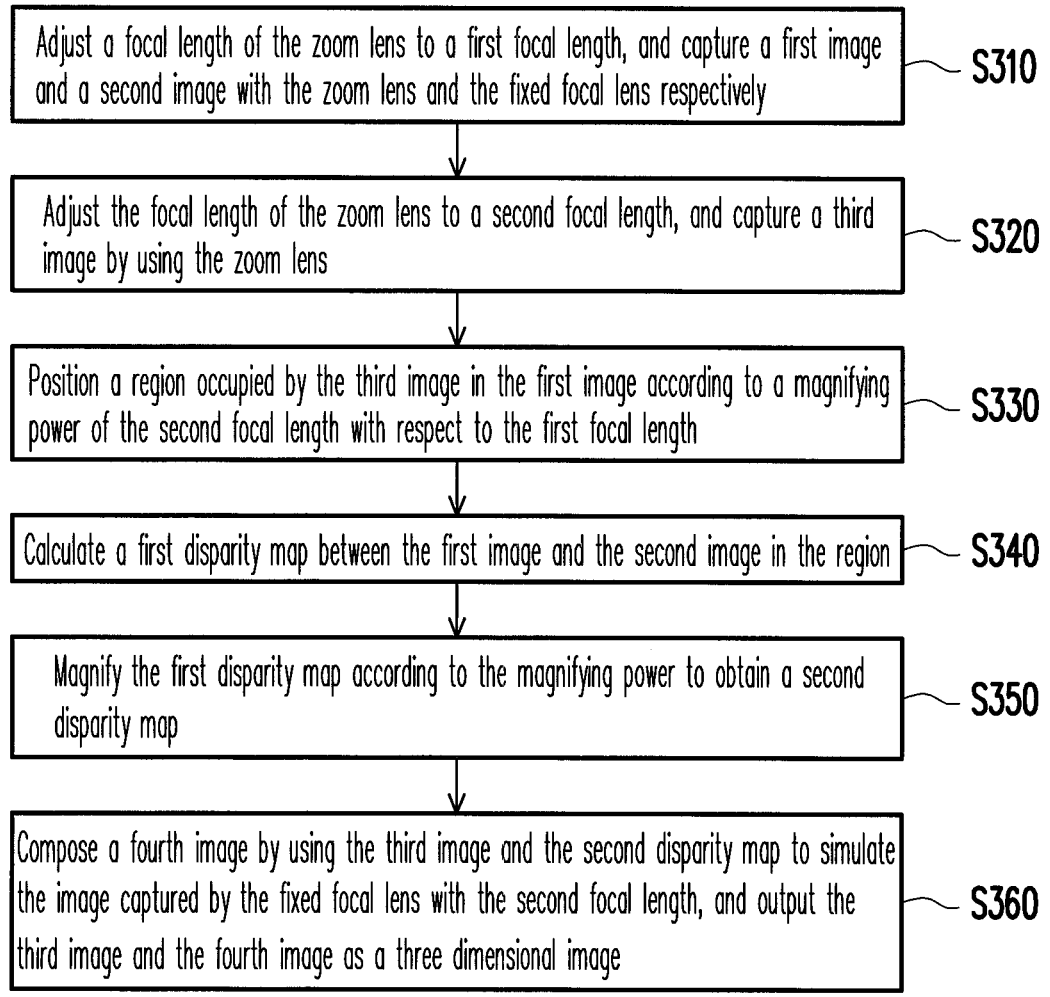
FIG. 3 is a flow chart of a method for composing a three dimensional image with a long focal length according to an embodiment of the present invention.

Particularly, FIG. 2 is a block diagram of a three dimensional imaging system according to an embodiment of the present invention. FIG. 3 is a flow chart of a method for composing a three dimensional image with a long focal length according to an embodiment of the present invention. Referring to FIGS. 2 and 3, a three dimensional imaging system 200 of this embodiment includes a zoom lens 210, a fixed focal lens 220, and a processing unit 230. The processing unit 230 includes a positioning module 232, a disparity calculating module 234, and an image composing module 236. According to this embodiment, when a user uses the three dimensional imaging system 200 to capture a three dimensional image with a long focal length, the processing unit 230 uses an image captured by the fixed focal lens 220 with a specific focal length and images captured by the zoom lens 210 with the specific focal length and another long focal length, to simulate a three dimensional image with the long focal length of the fixed focal lens 220. The process of the method of this embodiment is described in detail below with the elements of the three dimensional imaging system 200 in FIG. 2.

First, a focal length of the zoom lens is adjusted to a first focal length provided to the fixed focal lens 220, and a first image and a second image are captured with the zoom lens 210 and the fixed focal lens 220 respectively (Step S310). The zoom lens 210 and the fixed focal lens 220, for example, capture the images with the same parameters, in which the parameters include apertures, shutters and white balances in addition to focal lengths, and are not limited in this embodiment.

Next, the focal length of the zoom lens 210 is adjusted to a second focal length, and a third image is captured with the zoom lens 210 (Step S320). The second focal length is, for example, a focal length longer than the first focal length. When the main optical axis remains unchanged, the third image captured by the zoom lens 210 with the second focal length is actually a magnified image of the central region of the first image.

At this time, the positioning module 232 in the processing unit 230 positions a region occupied by the third image in the first image according to a magnifying power of the second focal length with respect to the first focal length (Step S330). For example, the positioning module 232 first determines a size occupied by the third image in the first image according to the magnifying power, and then captures a region of the determined size at the center of the first image as the region occupied by the third image in the first image.

Then, the disparity calculating module 234 in the processing unit 230 calculates a first disparity map between the first image and the second image in the region (Step S340). For example, the disparity calculating module 234 calculates disparity values of a plurality of pixels of the first image and the second image in the region, and collects the disparity values of the pixels to generate the first disparity map.

Furthermore, the disparity calculating module 234 further magnifies the first disparity map according to the magnifying power to obtain a second disparity map (Step S350). For example, the disparity calculating module 234 magnifies the first disparity map into the second disparity map through interpolation according to the magnifying power, such that the second disparity map obtained after magnification is identical to the third image captured by the zoom lens 210 with the second focal length in size.

Finally, the image composing module 236 composes a fourth image by using the third image and the second disparity map to simulate the image captured by the fixed focal lens with the second focal length, and outputs the third image and the fourth image as a three dimensional image (Step S360). For example, the image composing module 236 superposes the second disparity map on the third image to compose the fourth image.

Figure 4:
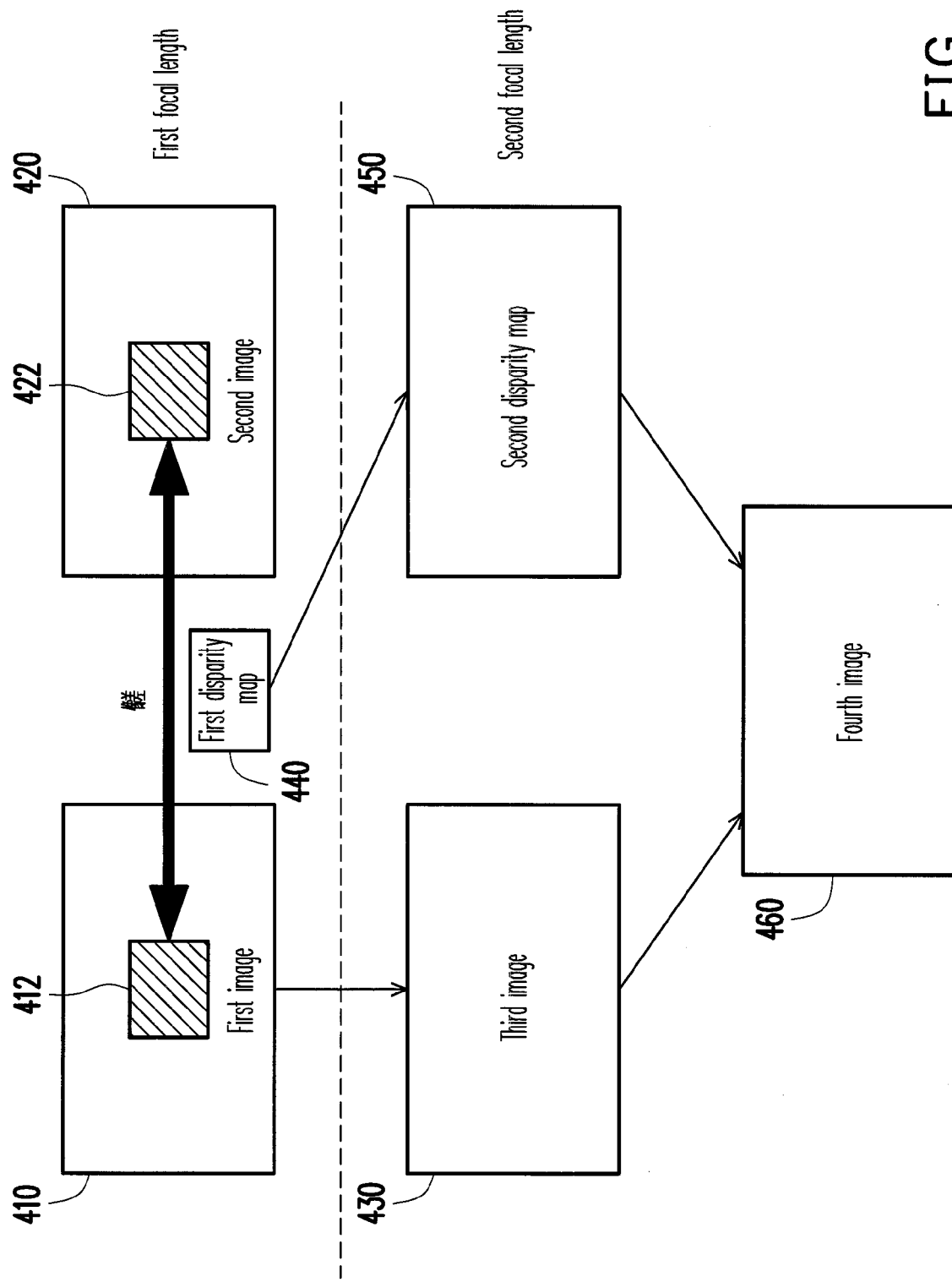
FIG. 4 is an example of composing a three dimensional image with a long focal length according to an embodiment of the present invention.

For example, FIG. 4 is an example of composing a three dimensional image with a long focal length according to an embodiment of the present invention. Referring to FIG. 4, in this embodiment, a first image 410 and a second image 420 with a first focal length are captured with a zoom lens and a fixed focal lens respectively, and then, the focal length of the zoom lens is adjusted to a second focal length longer than the first focal length, and a third image 430 with the second focal length is captured. At this time, a region 412 occupied by the third image 430 in the first image 410 is positioned according to a magnifying power of the second focal length with respect to the first focal length. Next, a first disparity map 440 between the region 412 of the first image 410 and a corresponding region 422 in the second image 420 is calculated, and a second disparity map 450 having the same size as the third image 430 is obtained through interpolation. Finally, the second disparity map 450 is superposed on the third image 430, to simulate a fourth image 460 with the second focal length of the fixed focal lens.

Through the method, a three dimensional image with different focal lengths can be simulated in a limited range of focal lengths, and the method is an effective method for extending three dimensional image capturing.

It should be noted that, besides the method of simulating the image with a long focal length by using the disparity map, the present invention further includes an example-based super resolution image method, which is capable of finding a correlation between the images captured by the zoom lens with different focal lengths, and training an example database. Thus, the three dimensional imaging system can search corresponding examples in high resolution images of the examples in low resolution images in the example database, and compose a high resolution three dimensional image with a long focal length. Another embodiment is given below for further description.

Figure 5:
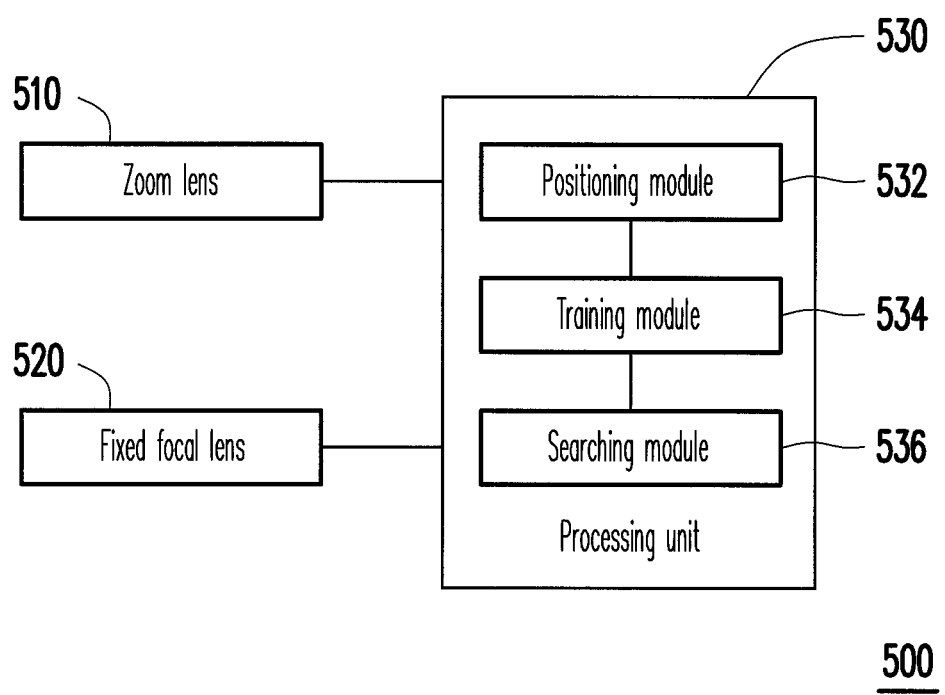
FIG. 5 is a block diagram of a three dimensional imaging system according to an embodiment of the present invention.
Figure 6:
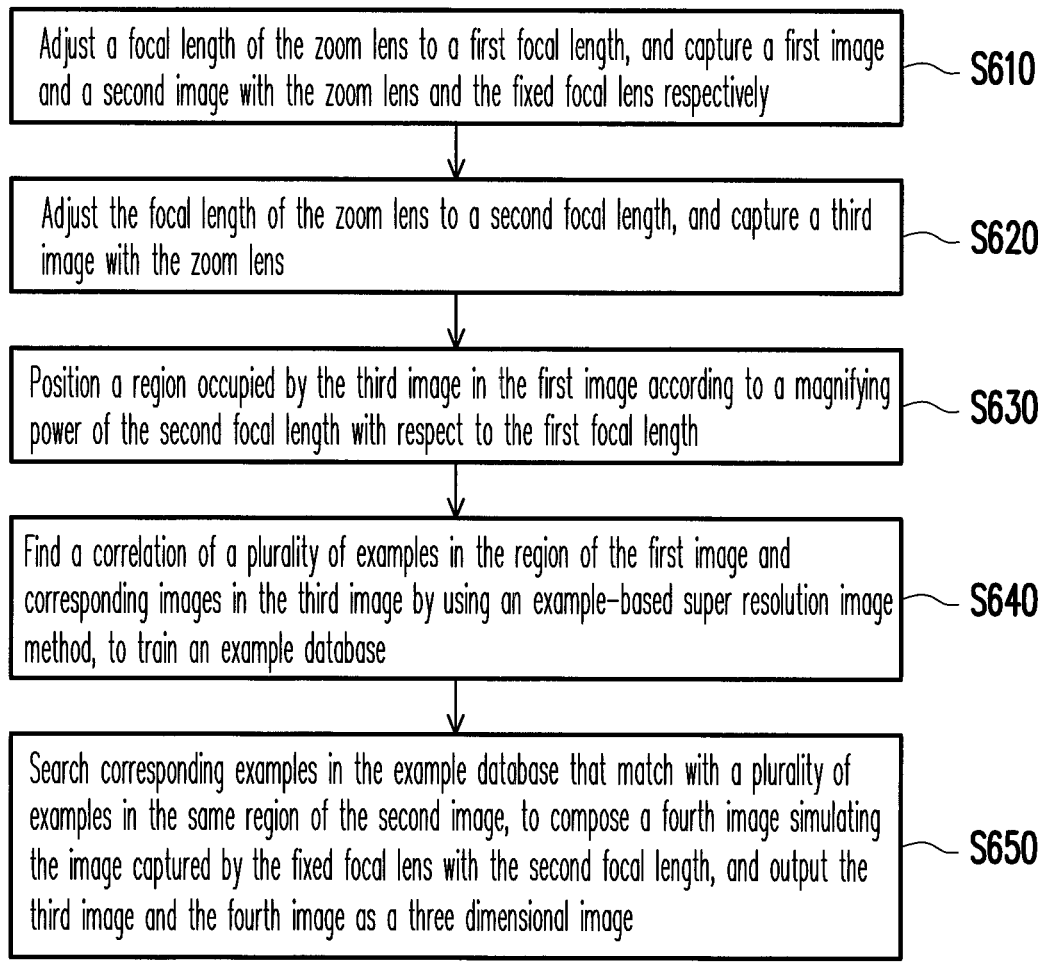
FIG. 6 is a flow chart of a method for composing a three dimensional image with a long focal length according to an embodiment of the present invention.

Particularly, FIG. 5 is a block diagram of a three dimensional imaging system according to an embodiment of the present invention. FIG. 6 is a flow chart of a method for composing a three dimensional image with a long focal length according to an embodiment of the present invention. Referring to FIGS. 4 and 5, a three dimensional imaging system 500 of this embodiment includes a zoom lens 510, a fixed focal lens 520, and a processing unit 530. The processing unit 530 includes a positioning module 532, a training module 534, and a searching module 536.

According to this embodiment, when a user uses the three dimensional imaging system 500 to capture a three dimensional image with a long focal length, the processing unit 530 uses an image captured by the fixed focal lens 520 with a specific focal length and images captured by the zoom lens 510 with the specific focal length and another long focal length, to simulate a three dimensional image with the long focal length of the fixed focal lens 520. The process of the method of this embodiment is described in detail below with the elements of the three dimensional imaging system 500 in FIG. 5.

First, a focal length of the zoom lens 510 is adjusted to a first focal length provided to the fixed focal lens 520, and a first image and a second image are captured with the zoom lens 510 and the fixed focal lens 520 respectively (Step S610). Next, the focal length of the zoom lens 510 is adjusted to a second focal length, and a third image is captured with the zoom lens 510 (Step S620). At this time, the positioning module 532 in the processing unit 530 positions a region occupied by the third image in the first image according to a magnifying power of the second focal length with respect to the first focal length (Step S630). The details of Steps S610-S630 are the same as or similar to those of Steps S310-S330 in the previous embodiment, and thus will not be described herein again.

The difference between this embodiment and the previous embodiment is as follows. In this embodiment, first, the training module 534 finds a correlation of a plurality of examples in the region of the first image and corresponding images in the third image by using an example-based super resolution image method, to train an example database (Step S640). Next, the searching module 536 searches corresponding examples in the example database that match with a plurality of examples in the same region of the second image, to compose a fourth image simulating the image captured by the fixed focal lens with the second focal length. Finally, the third image and the fourth image are output as a three dimensional image (Step S650). For example, the searching module 536 combines the matched corresponding examples according to relative positions of the examples in the region of the second image, to compose the fourth image.

Figure 7:
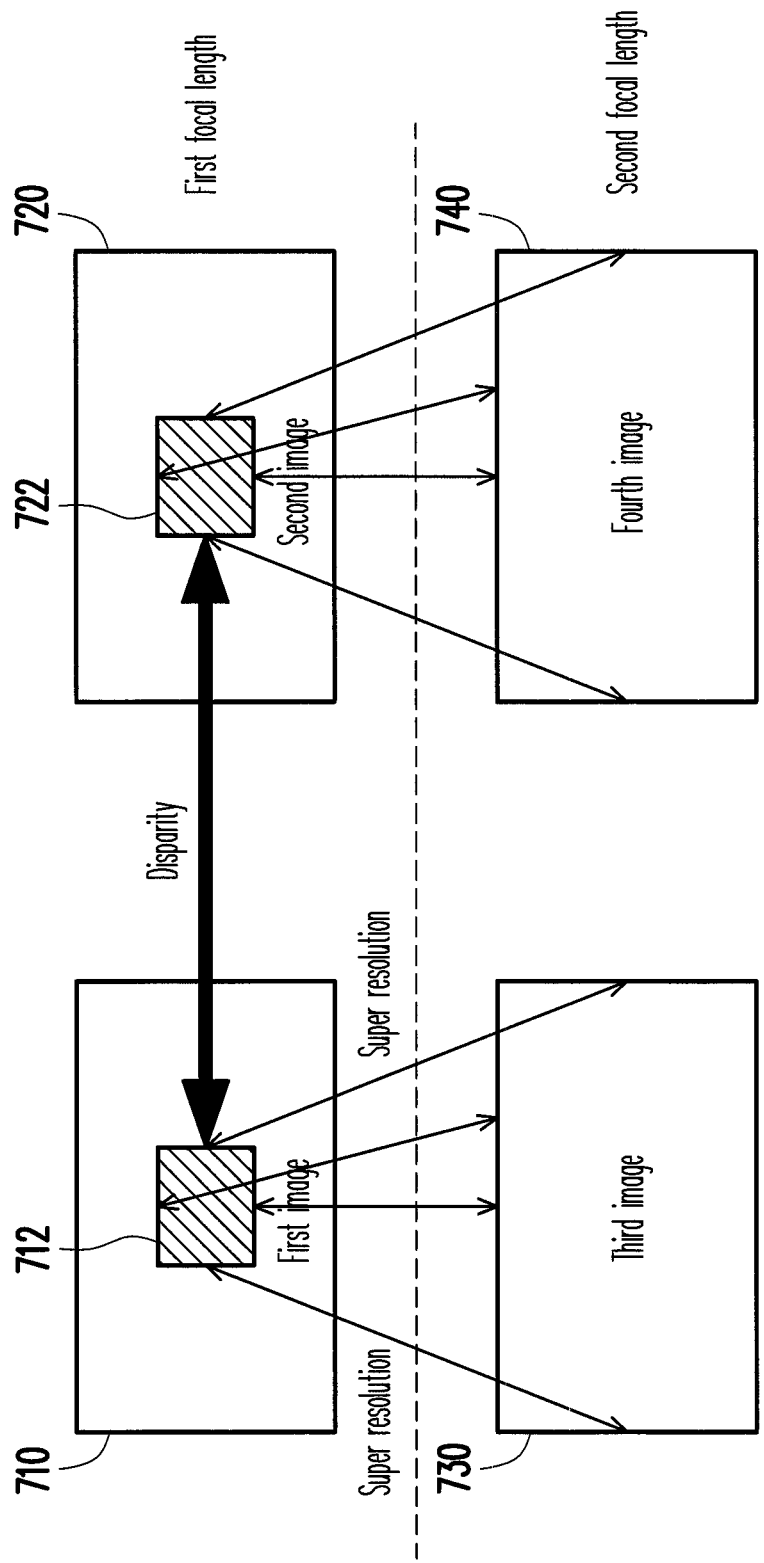
FIG. 7 is an example of composing a three dimensional image with a long focal length according to an embodiment of the present invention.

For example, FIG. 7 is an example of composing a three dimensional image with a long focal length according to an embodiment of the present invention. Referring to FIG. 7, in this embodiment, a first image 710 and a second image 720 with a first focal length are captured with a zoom lens and a fixed focal lens respectively, and then, the focal length of the zoom lens is adjusted to a second focal length longer than the first focal length, and a third image 730 with the second focal length is captured. At this time, a region 712 occupied by the third image 730 in the first image 710 is positioned according to a magnifying power of the second focal length with respect to the first focal length. Next, a correlation of a plurality of examples in the first image 710 and the third image 730 is found by using a super resolution image method, to establish an example database (not shown). Finally, as for a plurality of examples in a region 722 in the second image 720 corresponding to the position of the region 712, corresponding examples in the example database are searched, so as to compose a fourth image 740 simulating the image captured by the fixed focal lens with the second focal length.

It should be noted that, in this embodiment, a super resolution image algorithm of a single low resolution image is adopted, and if image interpolation is directly used on only a single low resolution image, only a high resolution image lack of details can be obtained. Therefore, in this embodiment, a correlation of a plurality of examples between a high resolution image (that is the third image) and a low resolution image (that is the first image) is first obtained through learning or reconstruction, to establish an example database of high resolution images. When it needs to compose a high resolution image of other low resolution images (that is the second image), details lost after the low resolution image is magnified can be found from the example database through searching or learning, and finally, the details are added into the magnified image, such that a high resolution image (that is the fourth image) with rich detail information can be obtained.

However, in this embodiment, the images captured by the zoom lens 210 and the fixed focal lens 220 overlap each other over a large portion, such that the example database established by images with long and short focal lengths of the zoom lens 210 are particularly suitable for composing an image with a long focal length of the fixed focal lens 220, because the examples in the image captured by the fixed focal lens 220 may be identical to the examples in the images captured by the zoom lens 210.

Based on the above, according to the method for composing a three dimensional image with a long focal length and the three dimensional imaging system of the present invention, the disparity map between the images captured by the zoom lens and the fixed focal lens is calculated, and is applied to the image with a long focal length captured by the zoom lens, so as to compose an image with the long focal length of the fixed focal lens. Furthermore, according to the present invention, an example database may also be obtained according to the correlation of corresponding examples in the images with the long and short focal lengths captured by the zoom lens, so as to compose the image with the long focal length of the fixed focal lens, thus providing a desirable three dimensional imaging effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for composing a three dimensional image with a long focal length, applicable to a three dimensional imaging system comprising a zoom lens and a fixed focal lens, wherein the fixed focal lens is provided with a first focal length, the method comprising:

adjusting a focal length of the zoom lens to the first focal length, and capturing a first image and a second image with the zoom lens and the fixed focal lens respectively;

adjusting the focal length of the zoom lens to a second focal length, and capturing a third image with the zoom lens;

positioning a region occupied by the third image in the first image according to a magnifying power of the second focal length with respect to the first focal length;

calculating a first disparity map between the first image and the second image in the region;

magnifying the first disparity map according to the magnifying power to obtain a second disparity map; and composing a fourth image by using the third image and the second disparity map to simulate the image captured by the fixed focal lens with the second focal length, and outputting the third image and the fourth image as a three dimensional image.

2. The method for composing a three dimensional image with a long focal length according to claim 1, wherein the step of positioning the region occupied by the third image in the first image according to the magnifying power of the second focal length with respect to the first focal length comprises:
  determining a size occupied by the third image in the first image according to the magnifying power; and
  acquiring a central region of the size in the first image as the region occupied by the third image in the first image.

3. The method for composing a three dimensional image with a long focal length according to claim 1, wherein the step of calculating the first disparity map between the first image and the second image in the region comprises:
  calculating disparity values of a plurality of pixels of the first image and the second image in the region; and
  collecting the disparity values of the pixels to generate the first disparity map.

4. The method for composing a three dimensional image with a long focal length according to claim 1, wherein the step of magnifying the first disparity map according to the magnifying power to obtain the second disparity map comprises:
  magnifying the first disparity map into the second disparity map through interpolation according to the magnifying power.

5. The method for composing a three dimensional image with a long focal length according to claim 1, wherein the step of composing the fourth image by using the third image and the second disparity map to simulate the image captured by the fixed focal lens with the second focal length comprises:
  superposing the second disparity map on the third image to compose the fourth image.

6. A method for composing a three dimensional image with a long focal length, applicable to a three dimensional imaging system comprising a zoom lens and a fixed focal lens, wherein the fixed focal lens is provided with a first focal length, the method comprising:
  adjusting a focal length of the zoom lens to the first focal length, and capturing a first image and a second image with the zoom lens and the fixed focal lens respectively;
  adjusting the focal length of the zoom lens to a second focal length, and capturing a third image with the zoom lens;
  positioning a region occupied by the third image in the first image according to a magnifying power of the second focal length with respect to the first focal length;
  finding a correlation of a plurality of examples in the region of the first image and corresponding examples in the third image by using an example-based super resolution image method, to train an example database; and
  searching corresponding examples in the example database that match with a plurality of examples in the region of the second image, to compose a fourth image simulating the image captured by the fixed focal lens with the second focal length, and outputting the third image and the fourth image as a three dimensional image.

7. The method for composing a three dimensional image with a long focal length according to claim 6, wherein the step of positioning the region occupied by the third image in the first image according to the magnifying power of the second focal length with respect to the first focal length comprises:
  determining a size occupied by the third image in the first image according to the magnifying power; and
  acquiring a central region of the size in the first image as the region occupied by the third image in the first image.

8. The method for composing a three dimensional image with a long focal length according to claim 6, wherein the step of searching the corresponding examples in the example database that match with the examples in the region of the second image, to compose the fourth image simulating the image captured by the fixed focal lens with the second focal length comprises:
  combining the matched corresponding examples according to relative positions of the examples in the region of the second image, to compose the fourth image.

9. A three dimensional imaging system, comprising:
  a zoom lens, for capturing a first image with a first focal length, and capturing a third image with a second focal length;
  a fixed focal lens, provided with a first focal length, and for capturing a second image, wherein a lens pitch exists between the zoom lens and the fixed focal lens; and
  a processing unit, coupled to the zoom lens and the fixed focal lens, and comprising:
    a positioning module, for positioning a region occupied by the third image in the first image according to a magnifying power of the second focal length with respect to the first focal length;
    a disparity calculating module, for calculating a first disparity map between the first image and the second image in the region, and magnifying the first disparity map according to the magnifying power to obtain a second disparity map; and
    an image composing module, for composing a fourth image using the third image and the second disparity map to simulate the image captured by the fixed focal lens with the second focal length, and outputting the third image and the fourth image as a three dimensional image.

10. A three dimensional imaging system, comprising:
  a zoom lens, for capturing a first image with a first focal length, and capturing a third image with a second focal length;
  a fixed focal lens, provided with a first focal length, and for capturing a second image, wherein a lens pitch exists between the zoom lens and the fixed focal lens; and
  a processing unit, coupled to the zoom lens and the fixed focal lens, and comprising:
    a positioning module, for positioning a region occupied by the third image in the first image according to a magnifying power of the second focal length with respect to the first focal length;
    a training module, for finding a correlation of a plurality of examples in the region of the first image and corresponding examples in the third image by using an example-based super resolution image method, to train an example database; and
    a searching module, for searching corresponding examples in the example database that match with a plurality of examples in the region of the second image, to compose a fourth image simulating the image captured by the fixed focal lens with the second focal length, and outputting the third image and the fourth image as a three dimensional image.

* * * * *